Feb. 20, 1968  R. E. SMITH  3,369,883
METHOD OF SOFTENING GLASS FOR PUNCHING HOLES THEREIN
BY HEATING WITH A HIGH FREQUENCY PULSE CURRENT
Filed Oct. 27, 1964

INVENTOR.
ROY E. SMITH
BY
Sughrue, Rothwell, Mion, Zinn & Macpeak
ATTORNEYS.

3,369,883
METHOD OF SOFTENING GLASS FOR PUNCHING HOLES THEREIN BY HEATING WITH A HIGH FREQUENCY PULSE CURRENT
Roy E. Smith, Horseheads, N.Y., assignor to Corning Glass Works, Corning, N.Y., a corporation of New York
Filed Oct. 27, 1964, Ser. No. 406,822
8 Claims. (Cl. 65—112)

ABSTRACT OF THE DISCLOSURE

A method of punching holes in glass by disposing a pair of axially aligned electrodes on opposite sides of a pre-heated piece of glass and applying a high frequency pulse current having an on/off ratio of 1:10 across the electrodes. When the glass between the electrodes becomes molten one of the electrodes is punched through the glass to form a hole.

---

This invention relates in general to a method of punching holes in glass, and more particularly, to a novel method of punching holes in glass in which high frequency electrical current pulses are employed to locally heat the glass to a suitable punch-through temperature.

In one of the methods known in the prior art for perforating glass, as described in U.S. Patent No. 1,722,010 to Jesse T. Littleton, Jr. et al., a pre-heated piece of glass, of any desired shape, is placed on a support table between a pair of movable electrodes positioned directly opposite one another. The electrodes are then brought into contact with the glass and continuous sixty-cycle electrical current is applied to the electrodes. As the current passes through the glass the resistance offered by the latter generates sufficient heat to melt the glass, whereupon one of the electrodes is pushed through the glass to form the desired perforation.

This method of punching holes in glass, while useful in some situations, suffers from a great many disadvantages and drawbacks which renders it impractical and unsatisfactory in most modern day industrial applications, and the present invention is specifically aimed at successfully overcoming such disadvantages.

First of all, when using sixty-cycle power, the high temperature and radiant energy of the arcs that occur between the tips of the electrodes and the glass surface cause small particles of molten glass to be spattered on the surface of the glass, and also result in the deposition of a white ring of boric oxide which is volatilized from certain glasses during the heating of the spot to be punched. Both of these effects seriously impair the surface quality of the glass, which may be quite critical when the resultant product is to be used as an optical reflector, such as in a sealed beam headlight. These disadvantages are effectively eliminated by the use of high frequency electrical current pulses, as contemplated by the present invention. The electrical waveform applied to the punch electrodes, which may be supplied from a spark gap generator, consists of a series of short duration, high intensity pulses of current that are spaced apart from each other by intervals many times their own length, i.e., in the ratio of 10:1, for example. Such high frequency pulse current is very low in radiant energy and the relatively long "off" time between pulses allows the heat in the glass to dissipate into the surrounding areas, with the result that the glass does not become over-heated enough to spatter or volatilize.

Secondly, the electrodes are rapidly eroded when using sixty-cycle power by the intense heat developed and have a relatively short life span. The tips are actually burned away necessitating either costly and time-consuming re-grinding operations, which may be accomplished only a limited number of times, or total replacement. With high frequency pulse power, on the other hand, the arc energy does not reach a high enough level to significantly burn the electrode tips, and, once again, the relatively long "off" time between pulses permits the arc heat in the electrode tips to dissipate throughout the entire electrode bodies, thereby resulting in a greatly reduced operating temperature level. The increase experienced in the life of the punch electrodes using high frequency pulse power as contrasted to continuous sixty-cycle power has been in the order of 100:1.

Thirdly, the lethal effects of continuous sixty-cycle power at the voltage and current levels necessary for hole piercing requires the complete electrical shielding of the apparatus employed for the protection of the operator. In contrast, the relatively non-lethal effects of high frequency pulse power requires that only simple electrical shielding be provided in the limited vicinity of the power head of the apparatus, which permits far greater work accessibility with an attendant increase in production efficiency.

Lastly, the use of sixty-cycle power for the simultaneous punching of a plurality of holes in a single piece of glass requires heavy duty commutation and distribution equipment for each separate power head in a multihead, rotating machine, whereas with high frequency pulse power the number of electrical components required is greatly reduced and their physical size is smaller by a factor of approximately ten or more. This significant advantage permits the design of a more flexible and less expensive commutation and distribution system for the apparatus.

In an illustrative form of the application of the present invention, a piece of pre-heated glass is clamped on a support table between a pair of electrodes positioned opposite one another, and a high frequency pulse signal is applied across the electrodes. After the localized area of glass between the electrode tips has been heated to a molten state by the internal resistance of the glass, and to a lesser extent by the electrical arcs developed between the tips and the glass, the tips are moved downward in unison and the upper one thus punches a hole through the glass. The upper tip is then withdrawn, and, in the event that the hole is not a clean one and a bulb of extruded glass remains attached to the lower surface of the glass piece, a shearing bar is laterally wiped across the glass to break off the bulb. The roughened lower edge of the hole may then be smoothed off by any suitable method, such as firepolishing.

It will be appreciated that the present invention particularly lends itself to use in situations where it is desired to simultaneously punch a plurality of holes, which may be of different sizes, in a single piece of glass, such as a sealed beam headlight reflector, and a practical circuit for effecting such an operation will be described below.

It is, accordingly, a primary object of this invention to provide a novel method of punching holes in glass which advantageously features the use of high frequency electrical current pulses to heat the glass to the punch-through temperature.

It is a further object of this invention to provide such a method which effectively overcomes the above-noted disadvantages attendant with the prior art use of continuous sixty-cycle power for such heating and results in improved glass surface quality in the hole area, significantly longer electrode life, greater operator safety and simplified power commutation and distribution systems.

It is a further object of this invention to provide such a method in which the electrical waveform of the high frequency pulse power consists of a series of short duration, high intensity current pulses spaced apart from each other by intervals many times their down length, i.e., in the ratio of approximately 10:1.

It is a further object of this invention to provide such a method which is particularly suitable for the simultaneous punching of a plurality of holes, which may be of different sizes, in a single piece of glass, such as a sealed beam headlight reflector.

These and other objects and advantages of the present invention will be readily apparent to those skilled in the art from a consideration of the following description of an illustrative example of the invention, taken in conjunction with the following drawings, in which.

Figure 1:
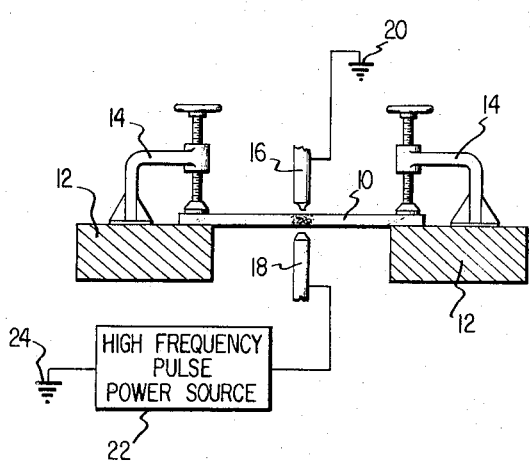
FIGURE 1 shows, in greatly simplified form, an apparatus that may be used to implement the present invention with a piece of glass operatively positioned in same.

Referring now to the drawings, in which the same reference numerals have been used in the various figures to designate like structure and features, FIGURE 1 shows a piece of glass 10, which in this case may be planar in form, positioned on a support table 12 by clamping means 14. An upper electrode 16 is located just above the glass and a co-operating lower electrode 18 is located immediately beneath the glass in axial alignment with the upper electrode. The spacing between the tips of the electrodes and the glass depends upon the thickness of the glass, the parameters of the electrical waveform to be used, the conductivity of the glass, etc., and the optimum distance will vary with each particular application. The upper electrode is grounded at 20, while the lower electrode is connected to a source of high frequency electrical current pulses 22, the source itself also being grounded at 24. Before the glass 10 is clamped on the support table 12 it must be pre-heated to its annealing point or higher to render it sufficiently conductive and to prevent thermal shock breakage, and such pre-heating may be accomplished in any suitable manner, incidental to the present invention, such as by direct oven heating or as an inherent result of a hot forming operation. As an alternative, the glass may be pre-heated in situ by means of gas burner electrodes, i.e., hollow electrodes through which a supply of combustible gas is forced.

Figure 2:
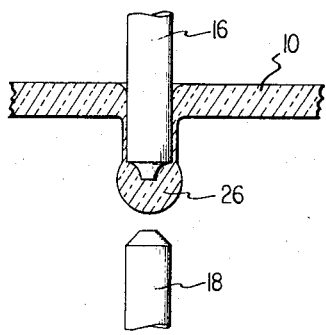
FIGURE 2 shows an electrode punching a hole in the glass.
Figure 3:
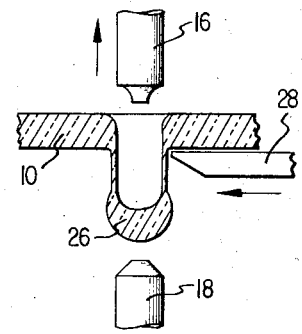
FIGURE 3 shows the partially formed hole and a shearing bar for breaking off a pendulous bulb.
Figure 4:
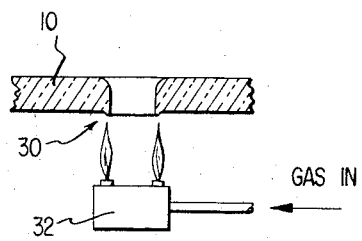
FIGURE 4 shows a burner for firepolishing the rough edges of a hole.

With the glass pre-heated and positioned as shown in FIGURE 1, the power source is switched on and high frequency current pulses are applied across the electrodes. The spacing between these pulses should be much greater than their duration, in the ratio of approximately 10:1, for example, and the instantaneous voltage of the pulses must be sufficiently high to arc across the short gaps between the electrode tips and the glass, thus giving rise to the conduction of intense, intermittent pulses of current through the glass. While the optimum frequency of these pulses may vary over a wide range, depending upon the particular parameters involved, a lower acceptable limit of approximately 100 kilocycles has been found to yield the most satisfactory results. Once the localized area of the glass has become heated by such current to the molten state as indicated by the shaded area between the electrodes in FIGURE 1, which usually takes only a few seconds, the power source is switched off and the upper and lower electrodes are moved downward in unison as shown in FIGURE 2, with the upper electrode thus punching the desired hole in the glass. Under certain conditions the slug of glass punched out by the upper electrode may fall free leaving a clean hole, but, as is usually the case, it will be extruded into the form of a pendulous bulb 26 which adheres to the lower surface of the piece of glass. The upper electrode is then withdrawn, as shown in FIGURE 3, and a shearing bar 28 may be wiped across the underside of the glass to break off the bulb. To complete the operation, the sharp glass web 30 protruding around the lower edge of the hole may be smoothed off by any convenient method, such as by firepolishing with a gas burner 32 as shown in FIGURE 4, or by reaming or grinding.

Figure 5:
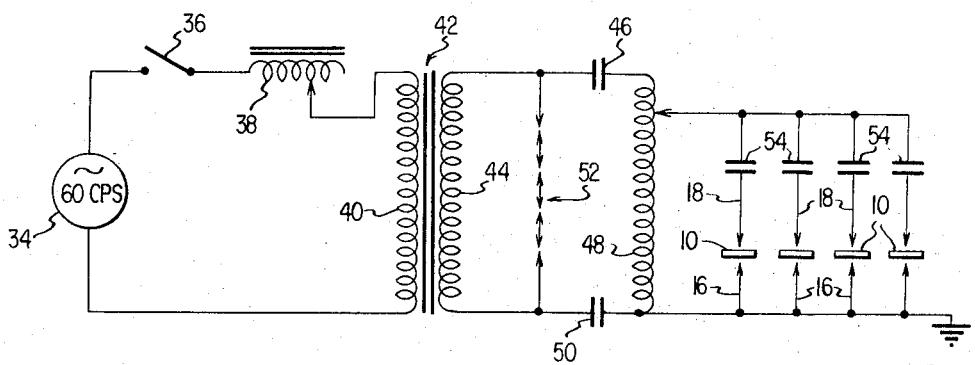
FIGURE 5 shows a schematic diagram of an electrical circuit for providing the high frequency pulse signal employed in the present invention.

Although there are many known electrical apparatuses for producing high frequency pulse waveforms of the type used with the present invention, one form of such apparatus which may be advantageously employed is a spark gap generator, as schematically shown in FIGURE 5. Essentially, a sixty-cycle power source 34 is applied through a switch 36 and a current limiting, variable inductance or ballasting device 38 to the primary winding 40 of a high voltage step-up transformer 42. The secondary winding 44 of the transformer is connected to an LC tank circuit including the series combination of capacitor 46, tapped inductor 48 and capacitor 50, and the tank circuit is paralleled by a series of spark gap electrodes 52. When driven by the sixty-cycle signal induced in the secondary winding 44 of transformer 42, the LC tank circuit oscillates at its natural reasonant frequency, and the electrodes 52 are adjusted so that they break down or are sometime just before the peak amplitude of each oscillation. Each breakdown gives rise to a short, high intensity current pulse through the inductor 48, and these pulses are applied to the punch electrodes 16, 18 through distribution capacitor 54. One advantage of using a spark gap generator as the source of the required current pulses is that such a generator produces damped pulses that exhibit very little transient or oscillary fluctuation after each breakdown. The pulses have a relatively "clean" waveform and as such yield more satisfactory and consistent results. It will be noted that four sets of parallel connected punch stations have been shown in FIGURE 5, and this has been done to illustrate one acceptable distribution circuit design when it is desired to simultaneously punch more than one hole. The only limitation in the number of holes that may be simultaneously punched in accordance with the present invention is the amount of electrical power available from, in this instance, the spark gap generator. By varying the parameters of the distribution capacitors, which act as current limiting reactors, and the diameters of the punch electrodes, it is also possible to punch holes of different sizes.

In one practical example of the application of the present invention using the circuit shown in FIGURE 5, the following parameters were employed:

| | |
|---|---|
| Sixty-cycle power source 34 _____ kilowatts__ | 3 |
| $C_{46, 50}$ (each) _____ microfarad__ | .02 |
| $L_{48}$ _____ microhenries__ | 12 |
| Oscillating frequency _____ kilocycles__ | 450 |
| $C_{54}$ (each) _____ microfarad__ | .002 |
| Spacing of punch electrodes from glass ____ inch__ | 1/32 |
| Pulse length _____ microseconds__ | 10 |
| Spacing between pulses _____ do____ | 110 |

With the above values four 1/4 inch holes were punched in a piece of 1/4 inch thick Corning Code 7740 glass with a current of 2 amperes for each punch station and a power "on" time of 7 seconds before punching.

As may be seen from the above description, the present invention provides a novel method of punching holes in the glass using high frequency electrical current pulses to locally heated the glass to the punch-through temperature instead of continuous sixty-cycle power, as in the prior art. Such high frequency pulse power having an on/off ratio of less than unity results in better glass surface quality with minimum spattering and staining, appreciably longer punch electrode life, greater operator safety and permits the design of simplified power distribution systems.

While the invention has been described in connection with a specific embodiment thereof, it will be understood that it is not to be limited thereto as many minor changes and variations will be readily apparent to those skilled in this particular art, and the invention is to be accorded

What is claimed is:

1. A method of locally heating a pre-heated piece of glass to a molten state in a hole punching operation in which a pair of electrodes are disposed on opposite sides of the glass in the vicinity of the area to be punched, comprising the steps of:
   (a) generating a high frequency electrical pulse current having an on/off ratio of less than unity and an amplitude sufficient to generate heat within the glass at a local area at a rate sufficient to locally melt the glass, and
   (b) applying the high frequency electrical pulse current across the electrodes for a duration of time sufficient to soften the said area of the glass.

2. A method of heating glass as defined in claim 1 wherein the ratio is approximately 1:10.

3. A method of punching holes in glass comprising the steps of: disposing a pair of electrodes on opposite sides of a pre-heated piece of glass in the vicinity of the area to be punched, applying a high frequency electrical pulse current having an on/off ratio of less than unity and an amplitude sufficient to generate heat within the glass at a local area at a rate sufficient to melt the local area of the glass across the electrodes until the glass becomes locally heated to a molten state by the passage of current therethrough, and forcing a punching tool through the molten area of glass to thereby punch a hole in the glass.

4. A method of punching holes in glass as defined in claim 3 wherein the punching tool is one of the electrodes.

5. A method of punching holes in glass as defined in claim 4 wherein the on/off ratio of the electrical pulse current is approximately 1:10.

6. A method of punching holes in glass as defined in claim 5 wherein the electrodes are axially aligned with each other and comprising the further steps of: wiping a shearing bar across the surface of the glass to break off any protrusions that may remain as a consequence of the punching, and firepolishing the edges of the hole adjacent the broken off protrusion.

7. A method of punching holes in glass comprising the steps of: pre-heating a piece of glass, disposing a pair of axially aligned electrodes on opposite sides of the glass in the vicinity of the area to be punched, applying a high frequency electrical pulse current having an on/off ratio of approximately 1:10 and an amplitude sufficient to generate heat within the glass at a local area at a rate sufficient to melt the local area of the glass across the electrodes until the glass becomes locally heated to a molten state by the passage of current therethrough, forcing one of the electrodes through the molten area of glass to thereby punch a hole in the glass, wiping a shearing bar across the surface of the glass to break off any protrusions that may remain as a consequence of the punching, and firepolishing the edges of the hole adjacent the broken off protrusion.

8. A method of providing holes in glass as defined in claim 7 wherein the high frequency electrical pulse current is derived from a spark gap generator and exhibits a high degree of damping.

References Cited

UNITED STATES PATENTS

| | | | |
|---|---|---|---|
| 425,939 | 4/1890 | Gillinder | 65—105 X |
| 1,722,010 | 7/1929 | Littleton et al. | 65—112 |
| 2,902,575 | 9/1959 | Guyer | 219—383 |
| 3,212,870 | 10/1965 | Condon | 65—105 |

DONALL H. SYLVESTER, *Primary Examiner.*

A. D. KELLOGG, *Assistant Examiner.*